United States Patent
Guo et al.

(10) Patent No.: US 10,468,985 B2
(45) Date of Patent: Nov. 5, 2019

(54) INPUT AC LINE CONTROL FOR AC-DC CONVERTERS

(71) Applicant: FAIRCHILD SEMICONDUCTOR CORPORATION, Sunnyvale, CA (US)

(72) Inventors: Jason Guo, Cupertino, CA (US); Laszlo Balogh, Bedford, NH (US); Gwanbon Koo, Bucheon (KR); Sangcheol Moon, Daejeon (KR); Bonggeun Chung, Incheon (KR); Chenghao Jin, Seoul (KR)

(73) Assignee: FAIRCHILD SEMICONDUCTOR CORPORATION, Phoenix, AZ (US)

( * ) Notice: Subject to any disclaimer, the term of this patent is extended or adjusted under 35 U.S.C. 154(b) by 71 days.

(21) Appl. No.: 15/248,766

(22) Filed: Aug. 26, 2016

(65) Prior Publication Data

US 2017/0063225 A1 Mar. 2, 2017

Related U.S. Application Data

(60) Provisional application No. 62/210,863, filed on Aug. 27, 2015.

(51) Int. Cl.
| | |
|---|---|
| *H02M 3/158* | (2006.01) |
| *H02M 3/156* | (2006.01) |
| *H02M 7/06* | (2006.01) |
| *H02M 1/44* | (2007.01) |
| *H02M 1/14* | (2006.01) |
| *H02M 1/00* | (2006.01) |

(52) U.S. Cl.
CPC .............. *H02M 3/158* (2013.01); *H02M 1/14* (2013.01); *H02M 1/44* (2013.01); *H02M 3/156* (2013.01); *H02M 7/06* (2013.01); *H02M 2001/007* (2013.01)

(58) Field of Classification Search
CPC ...................... H02M 1/4225; H02M 3/158–44
See application file for complete search history.

(56) References Cited

U.S. PATENT DOCUMENTS

| 5,905,354 A * | 5/1999 | Futsuhara ............... G01P 13/00 318/700 |
| 6,069,807 A * | 5/2000 | Boylan ............. H02M 3/33569 323/288 |
| 6,218,891 B1 * | 4/2001 | Lotfi ................. H02M 3/33592 257/280 |
| 7,391,629 B2 * | 6/2008 | Ryu ........................ H02M 1/32 361/93.1 |
| 2008/0238397 A1 * | 10/2008 | Chen ....................... H02M 1/36 323/288 |
| 2010/0091220 A1 * | 4/2010 | Lee ..................... H05B 41/2855 349/70 |

(Continued)

Primary Examiner — Kyle J Moody
Assistant Examiner — Peter M Novak
(74) Attorney, Agent, or Firm — Dickinson Wright PLLC

(57) ABSTRACT

An AC-DC converter includes a main switch that is controlled according to an input AC line voltage. The main switch is allowed to be switched when a level of the input AC line voltage is within a regulation band, and is prevented from being switched when the level of the input AC line voltage is not within the regulation band. The regulation band can be dynamically adjusted based on load condition. The AC-DC converter can be a buck, boost, or buck-boost converter.

20 Claims, 26 Drawing Sheets

(56) References Cited

U.S. PATENT DOCUMENTS

| | | | | |
|---|---|---|---|---|
| 2011/0235368 A1* | 9/2011 | Khan | ............... | H02M 7/217 |
| | | | | 363/16 |
| 2012/0032605 A1* | 2/2012 | Peng | ............... | H05B 33/0815 |
| | | | | 315/219 |
| 2013/0127429 A1* | 5/2013 | Li | ............... | H02M 1/36 |
| | | | | 323/282 |
| 2014/0368741 A1* | 12/2014 | Joo | ............... | H02M 1/32 |
| | | | | 348/730 |
| 2015/0023070 A1* | 1/2015 | Nate | ............... | H02M 3/33507 |
| | | | | 363/21.17 |
| 2015/0130622 A1* | 5/2015 | Scuka | ............... | H02H 3/20 |
| | | | | 340/635 |
| 2015/0256060 A1* | 9/2015 | Faingersh | ............... | H02M 1/36 |
| | | | | 323/267 |
| 2015/0280593 A1* | 10/2015 | Ando | ............... | H02M 1/42 |
| | | | | 363/17 |
| 2016/0134085 A1* | 5/2016 | Obe | ............... | F02P 5/1502 |
| | | | | 123/406.12 |

\* cited by examiner

HIGH LINE

LOW LINE

HIGH LINE

LOW LINE

HIGH LINE

INPUT AC LINE CONTROL FOR AC-DC CONVERTERS

CROSS-REFERENCE TO RELATED APPLICATION

This application claims the benefit of U.S. Provisional Application No. 62/210,863, filed on Aug. 27, 2015, which is incorporated herein by reference in its entirety.

BACKGROUND OF THE INVENTION

1. Field of the Invention

The present invention relates generally to electrical circuits, and more particularly but not exclusively to AC-DC converters.

2. Description of the Background Art

AC-DC converters are electrical circuits that convert an alternating current (AC) input to a direct current (DC) output. AC-DC converters are typically employed in power supply applications. AC-DC converters may include a main switch that is switched by pulse width modulation (PWM) to maintain a regulated DC output voltage. An AC-DC converter may be a boost converter that converts a low input AC line voltage to a high DC output voltage. An AC-DC converter may also be a buck converter that converts a high input AC line voltage to a low DC output voltage. In either case, the main switch is switched with a duty ratio to maintain the DC output voltage within regulation.

SUMMARY

In one embodiment, an AC-DC converter includes a main switch that is controlled according to an input AC line voltage to the AC-DC converter. The main switch is allowed to be switched when a level of the input AC line voltage is within a regulation band, and is prevented from being switched when the level of the input AC line voltage is not within the regulation band. The regulation band may be dynamically adjusted based on load condition. The AC-DC converter can be a buck, boost, or buck-boost converter.

In another embodiment, a method of operating an AC-DC converter comprises rectifying an input AC line voltage to generate a rectified input AC line voltage, controlling a switching operation of a main switch to generate an output DC voltage, and preventing the main switch from switching when the level of the rectified input AC line voltage is not within a regulation band. The regulation band may be varied based on load conditions. The main switch may be prevented from switching when the level of the rectified input AC line voltage is not within the regulation band during high line or low load condition. The switching of the main switch may always be allowed when the level of the rectified input AC line voltage is higher than a low band threshold of the regulation band during low line or heavy load condition. The main switch may be controlled by its peak current or turn-on time operating in the regulation band. A current through the main switch may be increased gradually pulse-by-pulse so that the current through the main switch ramps up in the regulation band. The current through the main switch may be decreased gradually pulse-by-pulse so that the current through the main switch ramps down before the main switch is prevented from switching.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
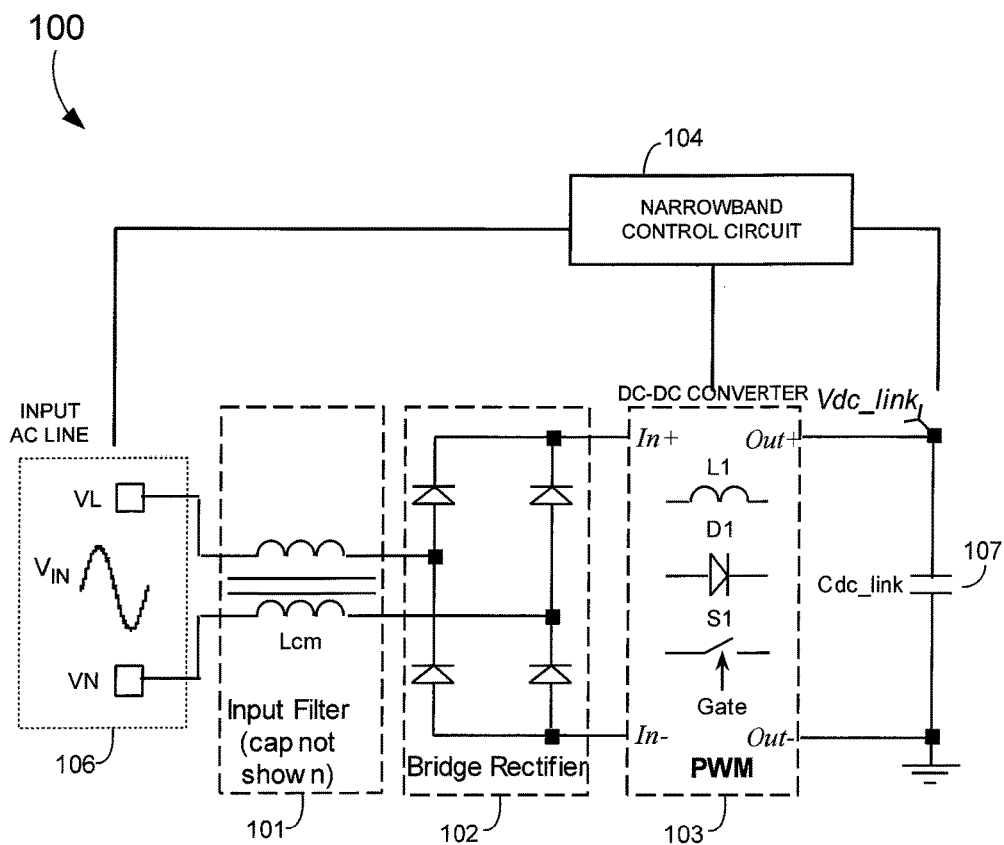
FIG. 1 shows a schematic diagram of an AC-DC converter in accordance with an embodiment of the present invention.

FIG. 1 shows a schematic diagram of an AC-DC converter 100 in accordance with an embodiment of the present invention. In the example of FIG. 1, the AC-DC converter 100 includes an input filter 101 for minimizing electromagnetic interference (EMI) and the amount of AC ripple current drawn from an input AC line voltage (FIG. 1, 106), a bridge rectifier 102 for rectifying the input AC line voltage, and a DC-DC converter 103 for converting the rectified input AC line voltage to a DC output voltage. In the example of FIG. 1, the DC output voltage is a DC link voltage (Vdc_link) that is developed across an output DC link capacitor 107 (Cdc_link).

Figure 2:
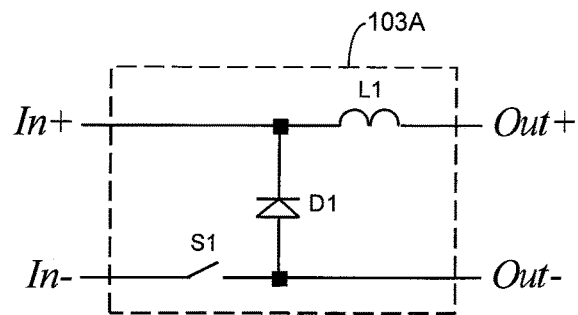
FIGS. 2-4 show example DC-DC converters that may be implemented in the AC-DC converter of FIG. 1.
Figure 3:
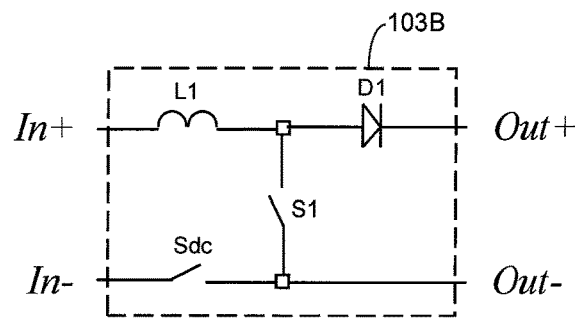
Figure 4:
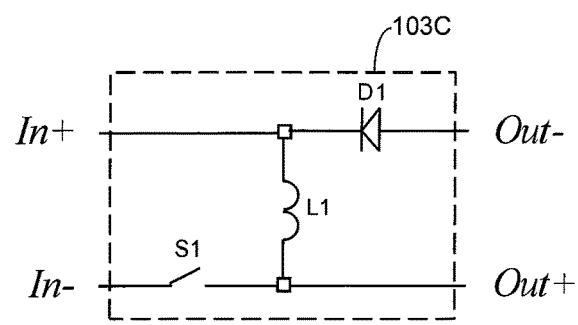

Generally speaking, the DC-DC converter 103 may include an output inductor L1, a freewheeling diode D1, and a main switch S1. The main switch S1 may be, for example, a metal oxide semiconductor (MOS) transistor. The DC-DC converter 103 has a positive input terminal (IN+), a negative input terminal (IN−), a positive output terminal (OUT+), and a negative output terminal (OUT−). The DC-DC converter 103 may comprise a buck converter 103A as shown in FIG. 2, a boost converter 103B as shown in FIG. 3, or a buck-boost converter 103C as shown in FIG. 4, for example.

In the example of FIG. 1, the switching operation of the main switch S1 of the DC-DC converter 103 is controlled by PWM. As will be more apparent below, the AC-DC converter 100 of FIG. 1 is configured to confine the PWM operation of the main switch S1 within a pre-determined PWM zone that is defined by a regulation band. The regulation band may be a range of input AC line voltage levels where switching of the main switch is allowed to maintain the output voltage of the AC-DC converter 100 in regulation. In some embodiments, such as in the boost converter 103B of FIG. 3, a DC switch Sdc is turned OFF, i.e., opened, when not in the PWM zone to prevent current flow through the diode D1 when not in the PWM zone and the input AC line voltage is higher than the DC link voltage.

In the example of FIG. 1, the AC-DC converter 100 includes an input AC line control circuit in the form of a narrowband control circuit 104. In one embodiment, the narrowband control circuit 104 is configured to sense the input AC line voltage, such as a rectified version of the input AC line voltage. The narrowband control circuit 104 may be configured to allow PWM operation of the main switch S1 only when the input AC line voltage is within the PWM zone. The narrowband control circuit 104 may also be configured to sense and limit the DC link voltage. In one embodiment, the input AC line voltage is within the PWM zone when the rectified input AC line voltage is between a low reference voltage and a high reference voltage. The low and high reference voltages set the opposing ends of the regulation band. In one embodiment, the narrowband control circuit 104 prevents the main switch S1 from being switched ON when the input AC line voltage is not in the PWM zone. That is, the main switch S1 cannot be switched ON unless the input AC line voltage is within the PWM zone.

Figure 5:
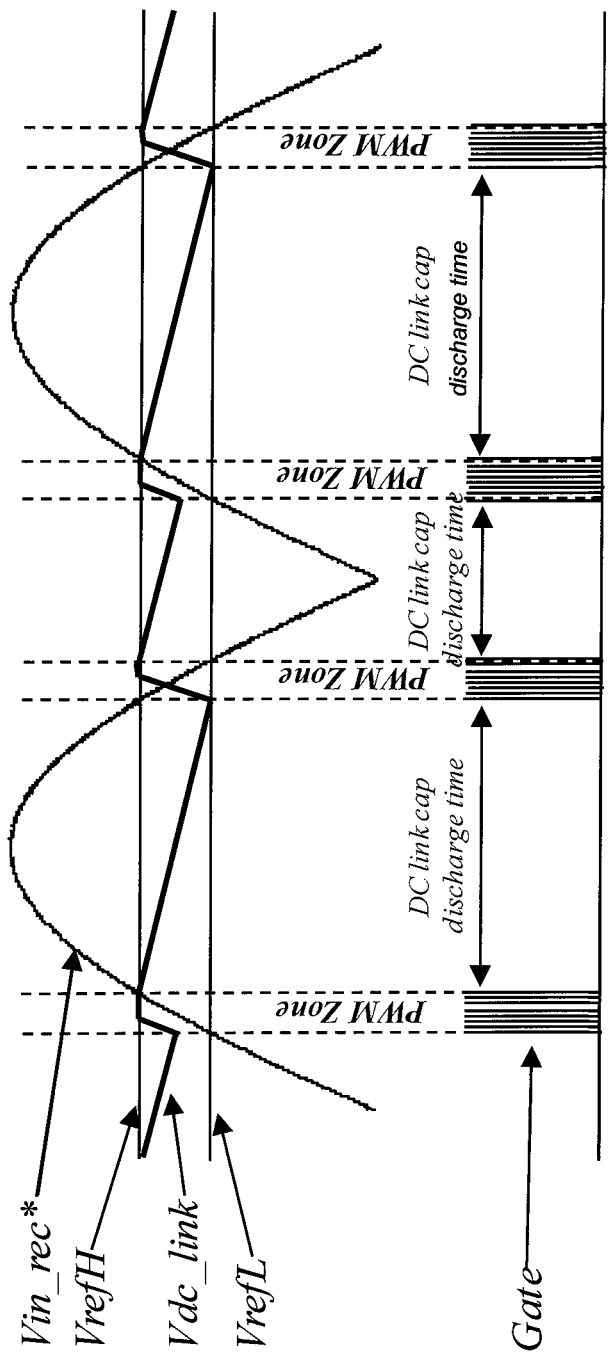
FIG. 5 shows waveforms of the AC-DC converter of FIG. 1 in accordance with an embodiment of the present invention.

FIG. 5 shows waveforms of the AC-DC converter 100 in accordance with an embodiment of the present invention. FIG. 5 shows the rectified input AC line voltage (Vin_rec), the high reference voltage (VrefH), the DC link voltage (Vdc_link), the low reference voltage (VrefL), and the gate control signal (GATE) that drives the main switch S1. In the example of FIG. 5, the rectified input AC line voltage is output by the bridge rectifier 102 (FIG. 1, 102). For clarity of illustration, the waveforms of FIG. 5 are not drawn to scale. Note that the level of the DC link voltage in relation to the rectified input AC line voltage may vary depending on the topology of the DC-DC converter 103.

In the example of FIG. 5, the low reference voltage (VrefL) and the high reference voltage (VrefH) define the PWM zone. The gate control signal is active to switch the main switch S1 ON and OFF when the input AC line voltage, which in this example is represented by the rectified input AC line voltage, is in the PWM zone In the example of FIG. 5, the main switch S1 is switched by PWM when the rectified input AC line voltage is higher than the low reference voltage but is lower than the high reference voltage. The main switch S1 cannot be switched ON outside the PWM zone, as indicated by the absence of gate signals outside the PWM zone. The DC link capacitor 107 is charged within the PWM zone, and is discharged outside the PWM zone.

The just described input AC line control of the AC-DC converter 100, among many advantages, facilitates AC-DC converter design optimization for further improved performance and eliminates high voltage operation and associated performance weaknesses. The input AC line control of the AC-DC converter 100 is "narrowband" in that the range of input AC line voltage levels where switching of the main switch S1 is allowed is relatively narrow.

Figure 6:
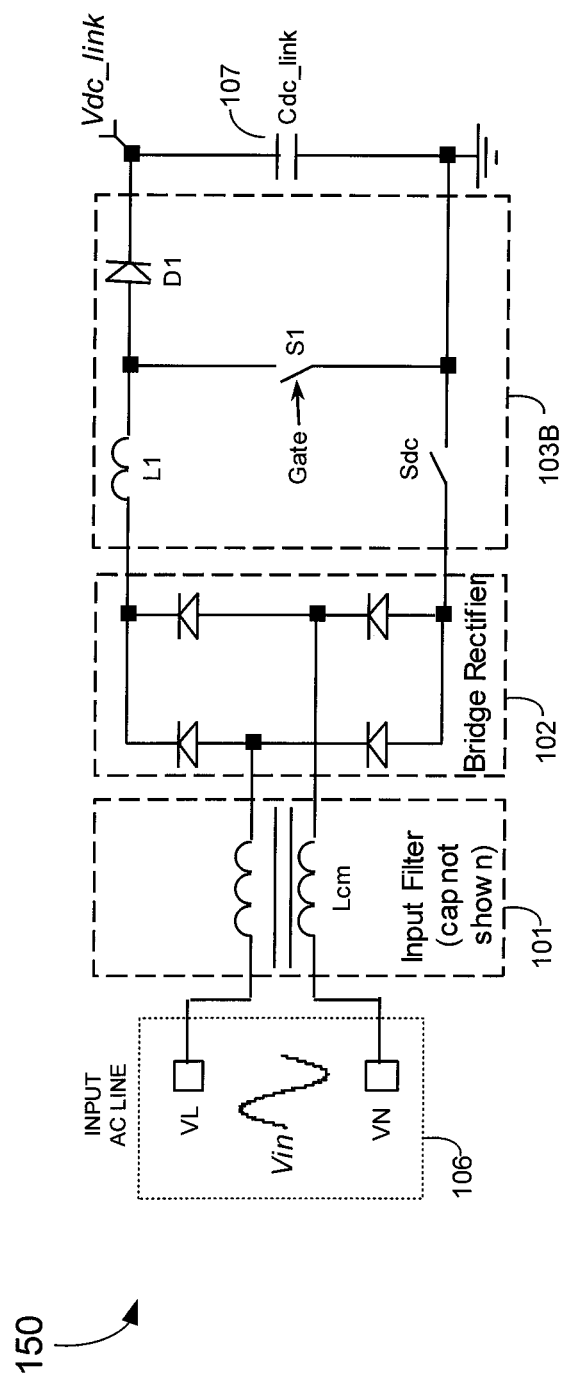
FIG. 6 shows a schematic diagram of an example AC-DC boost converter that may be adapted for input AC line control in accordance with an embodiment of the present invention.

FIG. 6 shows a schematic diagram of an example AC-DC boost converter 150 that may be adapted for input AC line control in accordance with an embodiment of the present invention. The AC-DC boost converter 150 is a particular embodiment of the AC-DC converter 100 of FIG. 1 that has a boost converter 103B for DC-DC conversion. The other components of the AC-DC boost converter 150 are as described with reference to FIG. 1. The AC-DC boost converter 150 may be operated with or without a narrowband control circuit 104.

Figure 7:
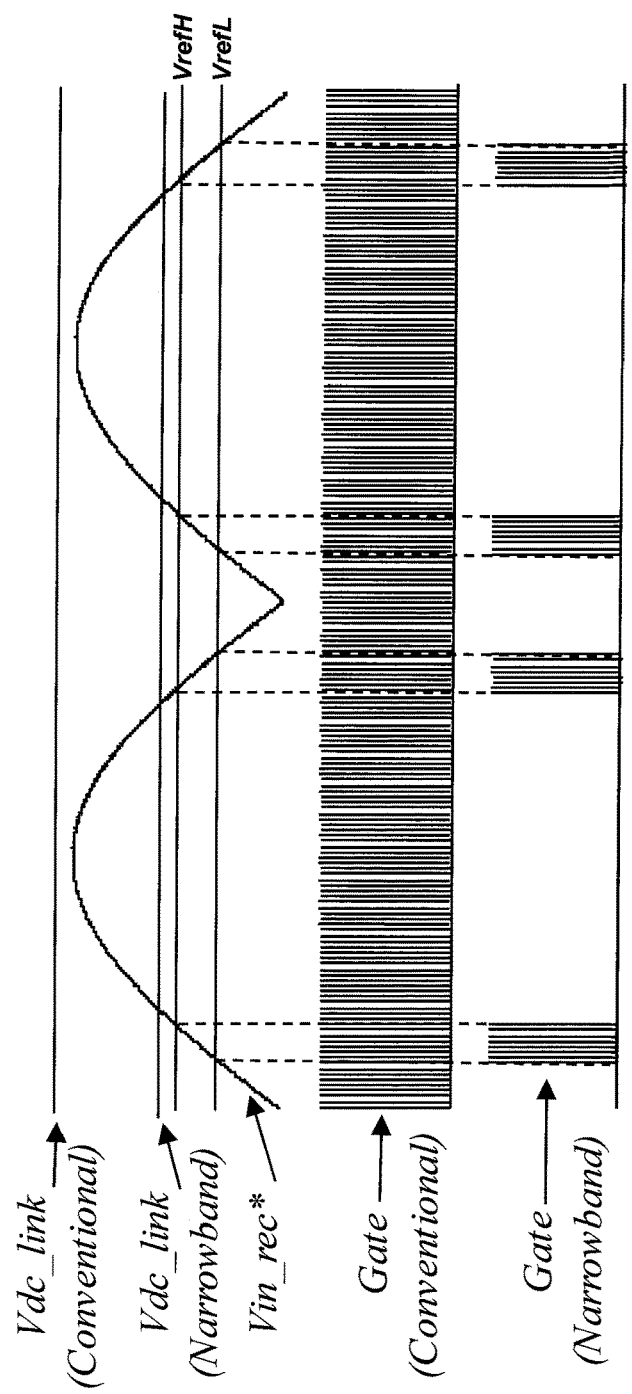
FIG. 7 shows example waveforms of the AC-DC boost converter of FIG. 6.

FIG. 7 shows waveforms of the AC-DC boost converter 150 in accordance with an embodiment of the present invention. FIG. 7 shows the rectified input AC line voltage (Vin_rec), the low reference voltage (VrefL), and the high reference voltage (VrefH). FIG. 7 shows the DC link voltage (Vdc_link (Narrowband)) and the gate control signal (Gate (Narrowband)) of the AC-DC boost converter 150 when operated with input AC line control, e.g., by incorporating a narrowband control circuit 104. For comparison, also shown in FIG. 7 are the DC link voltage (Vdc_link (Conventional)) and the gate control signal (Gate (Conventional)) of the AC-DC boost converter 150 without input AC line control. Generally speaking, compared to an AC-DC boost converter with input AC line control, a conventional AC-DC boost converter (i.e., without input AC line control) has relatively high switching loss near the peak of the rectified input AC line voltage, has a wide linear operating range (i.e., wide duty cycle variation and wide frequency variation at boundary mode), has worse efficiency and electromagnetic interference, and requires a high voltage DC link capacitor 107 (Cdc_link).

Figure 8:
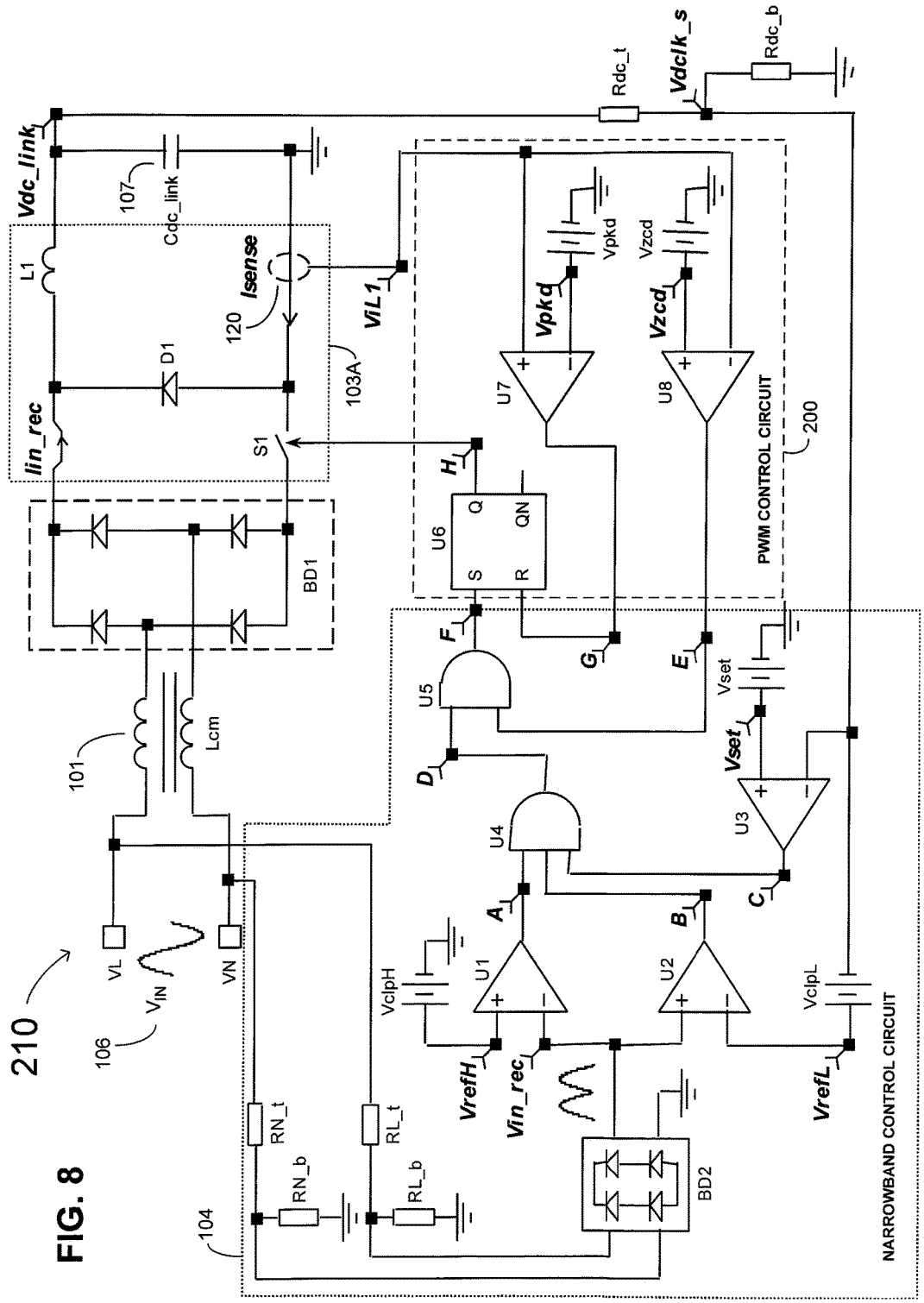
FIG. 8 shows a schematic diagram of an AC-DC buck converter in accordance with an embodiment of the present invention.

FIG. 8 shows a schematic diagram of an AC-DC buck converter 210 in accordance with an embodiment of the present invention. The AC-DC buck converter 210 is a particular embodiment of the AC-DC converter 100 of FIG. 1 with a buck converter 103A for DC-DC conversion.

In the example of FIG. 8, the input AC line voltage (FIG. 8, 106) is filtered by the input filter 101 and rectified by a bridge rectifier BD1. The rectified input AC line current (lin_rec) corresponding to the rectified input AC line voltage flows to the buck converter 103A. A PWM control circuit 200 controls switching of the main switch S1 by PWM to charge the DC link capacitor 107 (Cdc_link) to maintain a regulated DC link voltage (Vdc_link). The PWM control circuit 200 may employ any suitable conventional PWM scheme without detracting from the merits of the present invention.

In the example of FIG. 8, the PWM control circuit 200 comprises an SR flip-flop U6, a comparator U7, and a comparator U8. A sense circuit 120 generates a sense current Isense that is representative of the output current through the output inductor L1. The sense current Isense is converted to a voltage ViL1, which is a voltage indicative of the output current through the output inductor L1. The comparator U7 compares the voltage ViL1 to a peak voltage reference Vpkd to detect when to reset the SR flip-flop U6 to turn OFF the main switch S1, and the comparator U8 compares the voltage ViL1 to a zero crossing reference voltage Vzcd to detect when to set the SR flip-flop U6 to turn ON the main switch S1.

In the example of FIG. 8, the narrowband control circuit 104 includes an input AC line voltage sensor that comprises a second bridge rectifier BD2. The bridge rectifier BD2 rectifies the input AC line voltage to generate a rectified input AC line voltage (Vin_rec). In the example of FIG. 8, the comparators U1 and U2 generate the regulation band. More particularly, the rectified input AC line voltage from the bridge rectifier BD2 is compared to the low reference voltage (VrefL) by the comparator U2 and to the high reference voltage (VrefH) by the comparator U1 to determine whether or not the input AC line voltage is in the PWM zone. The high reference voltage may be defined by the voltage source VclpH, and the low reference voltage may be defined by the offset voltage source VclpL plus the attenuated Vdc_link voltage Vdclk_s.

When the rectified input AC line voltage is between the low reference voltage and the high reference voltage, the AND gate U5 is enabled to allow the PWM control circuit 200 to set the SR flip-flop U6 and thereby turn ON the main switch S1. The AND gate U5 is disabled to prevent the PWM control circuit 200 from turning ON the main switch S1 when the rectified input AC line voltage is lower than the low reference voltage or is higher than the high reference voltage.

In the example of FIG. 8, the maximum DC link voltage is set by the voltage Vset. The voltage divider formed by the resistors Rdc_t and Rdc_b provides a sensed DC link voltage Vdclk_s, which is compared by the comparator U3 to the voltage Vset. The comparator U3 allows the DC link voltage to stay at the high regulation band before the DC link capacitor starts to discharge.

Figure 9:
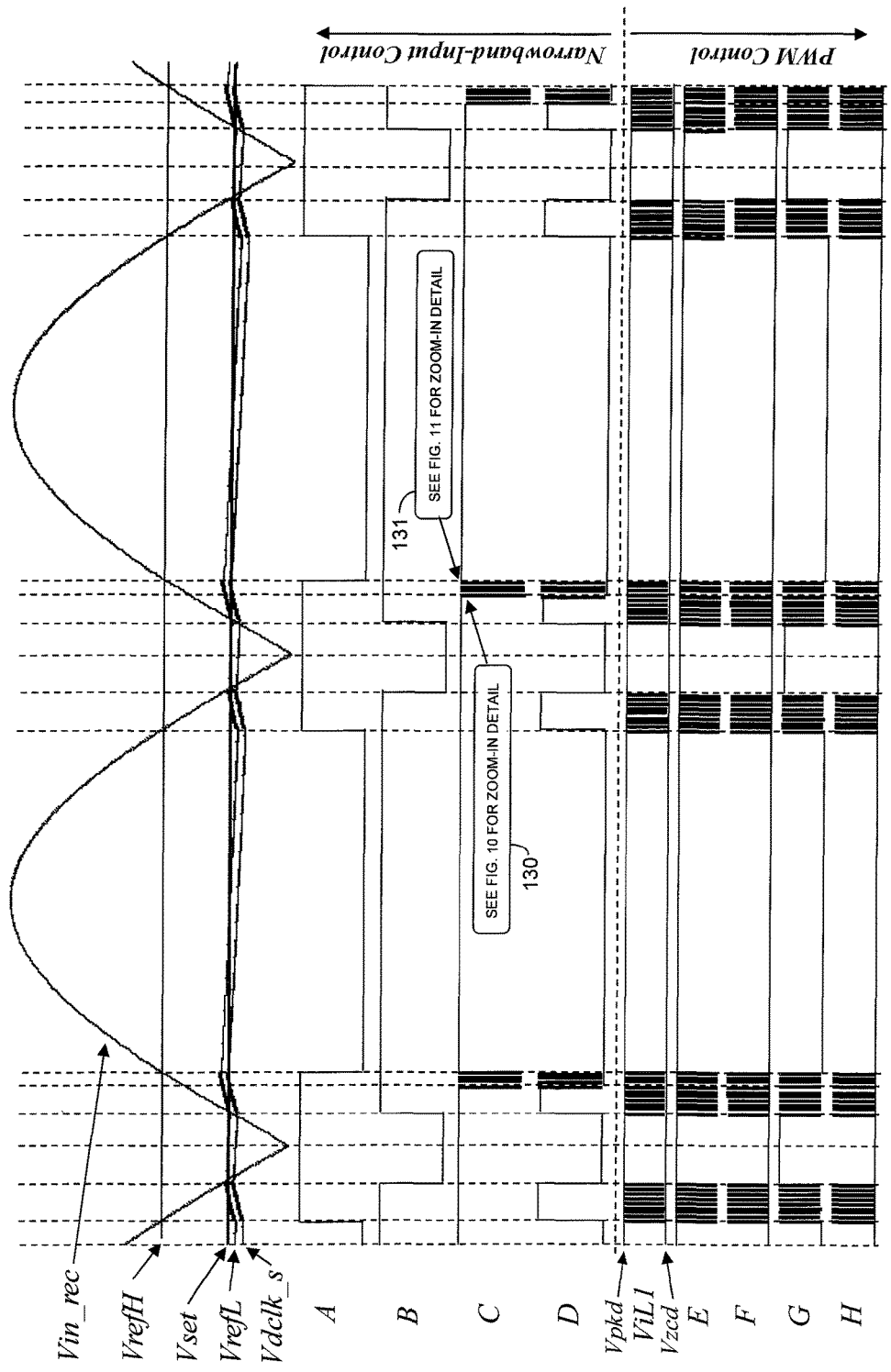
FIGS. 9-11 show waveforms at various nodes of the AC-DC buck converter of FIG. 8 in accordance with an embodiment of the present invention.
Figure 10:
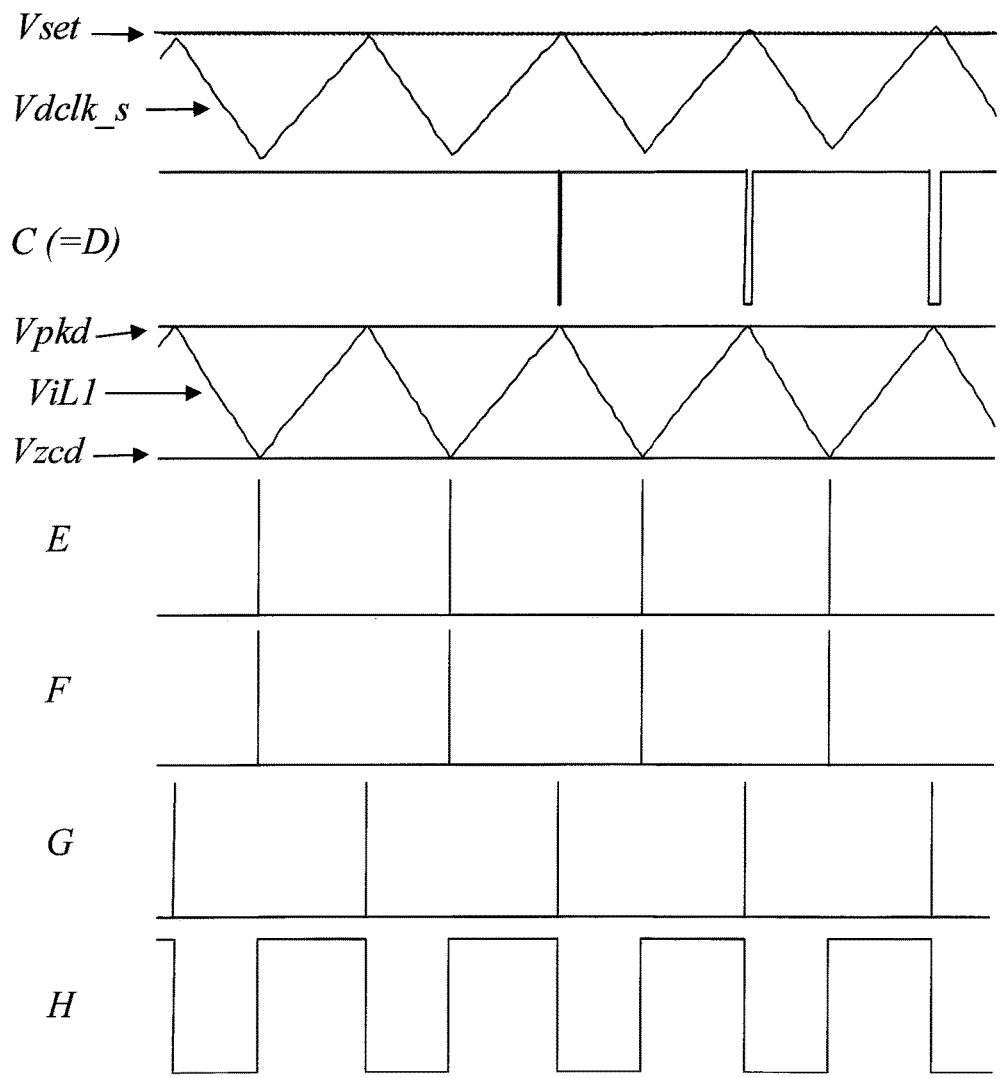
Figure 11:
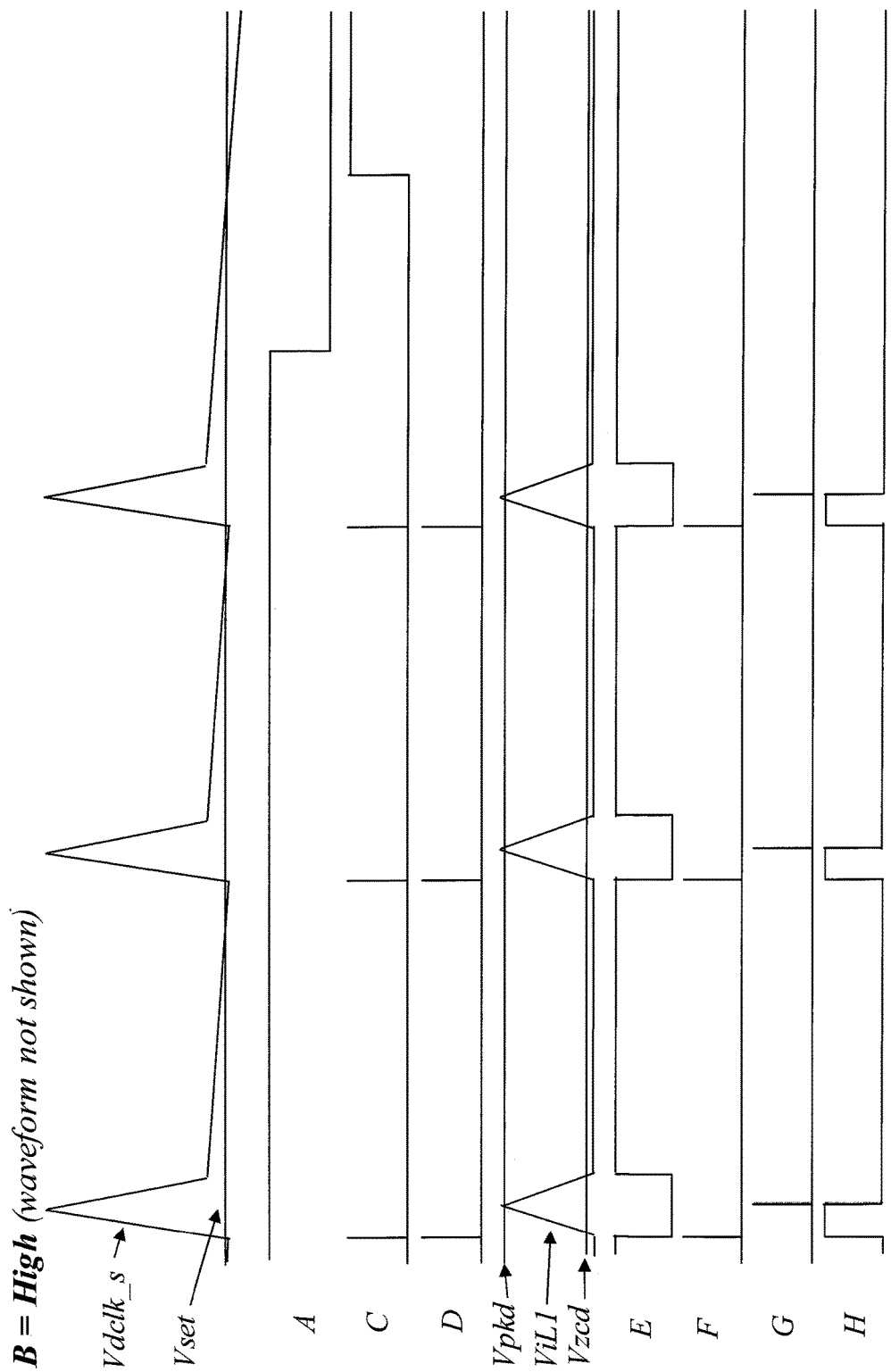

FIGS. 9-11 show waveforms at various nodes of the AC-DC buck converter 210 of FIG. 8 in accordance with an embodiment of the present invention. FIG. 9 shows the rectified input AC line voltage (Vin_rec), the high reference voltage (VrefH), the voltage Vset, the low reference voltage (VrefL), the sensed DC link voltage (Vdclk_s), the voltage at the node A, the voltage at the node B, the voltage at the node C, the voltage at the node D, the peak voltage reference Vpkd, the voltage ViL1, the zero-crossing reference voltage Vzcd, the voltage at the node E, the voltage at the node F, the voltage at the node G, and the voltage at the node H. The zoom-in detail of the waveforms at the transition 130 is shown in FIG. 10, and the zoom-in detail of the waveforms at the transition 131 is shown in FIG. 11.

Figure 12:
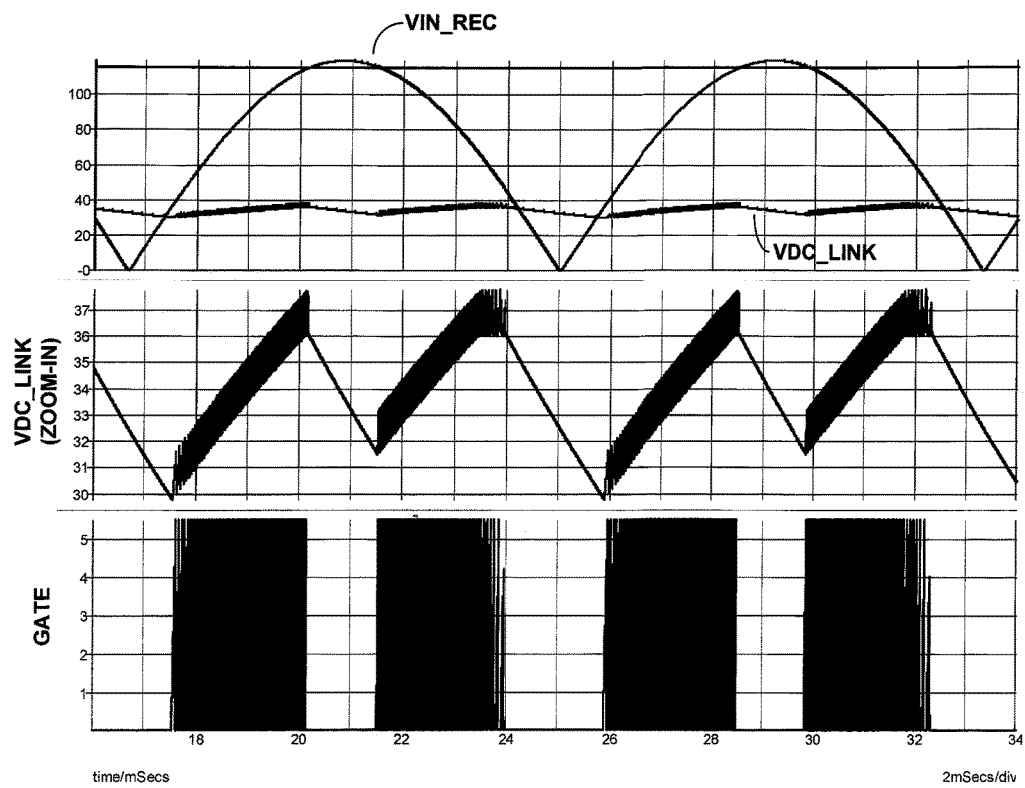
FIGS. 12 and 13 show typical operating waveforms of the AC-DC buck converter of FIG. 8 in accordance with an embodiment of the present invention.
Figure 13:
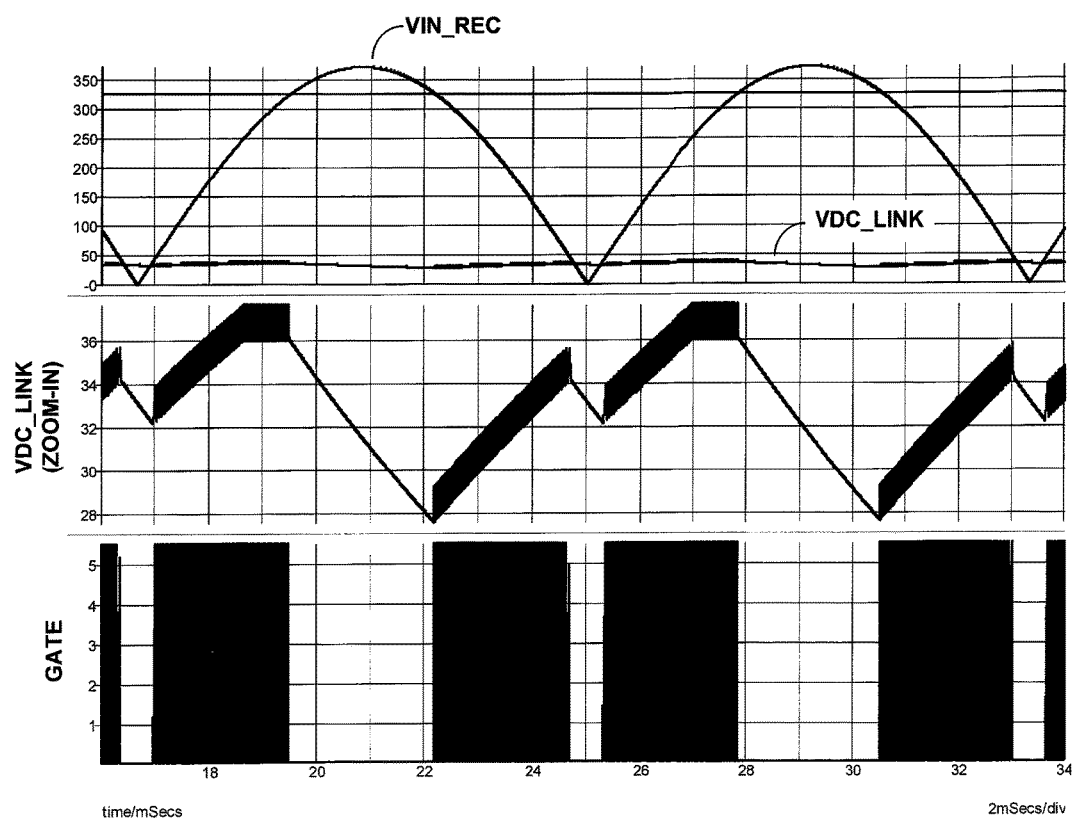

FIGS. 12 and 13 show typical operating waveforms of the AC-DC buck converter 210 of FIG. 8 in accordance with an embodiment of the present invention. FIGS. 12 and 13 show the rectified input voltage (VIN_REC), the DC link voltage (VDC_LINK), the zoom-in of the DC link voltage, and the gate signal driving the main switch S1 (GATE). FIG. 12 shows typical operating waveforms when the input AC line voltage is relatively low ("low line"), while FIG. 13 shows typical operating waveforms when the input AC line voltage is relatively high ("high line").

Figure 14:
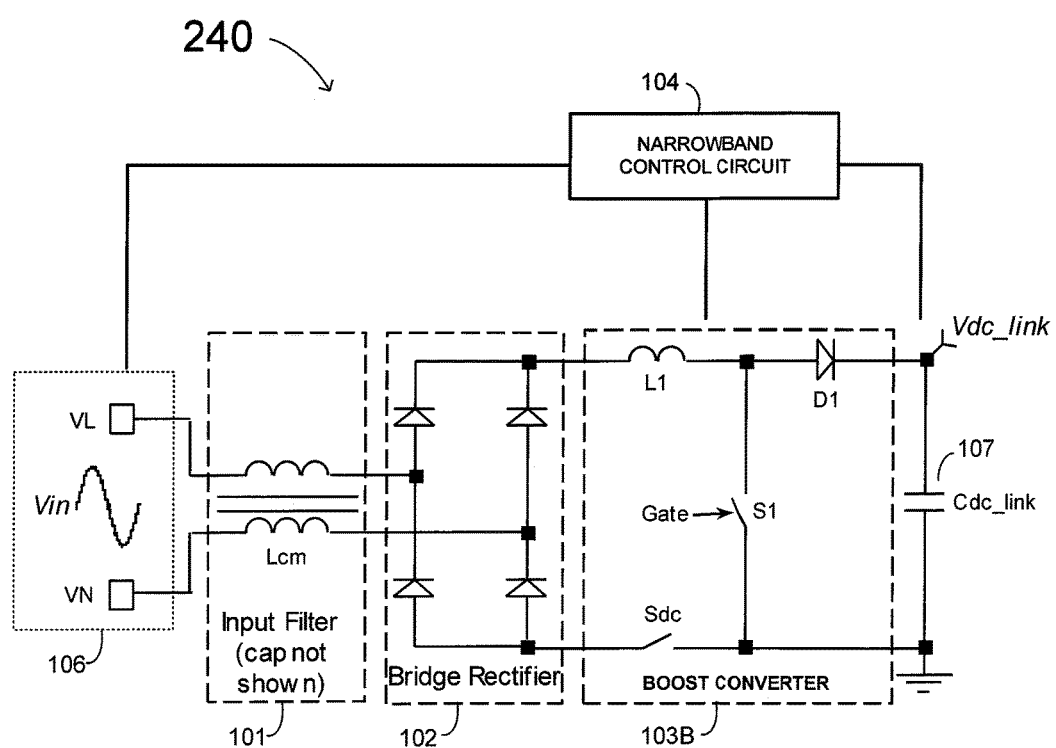
FIG. 14 shows a schematic diagram of an AC-DC boost converter in accordance with an embodiment of the present invention.
Figure 15:
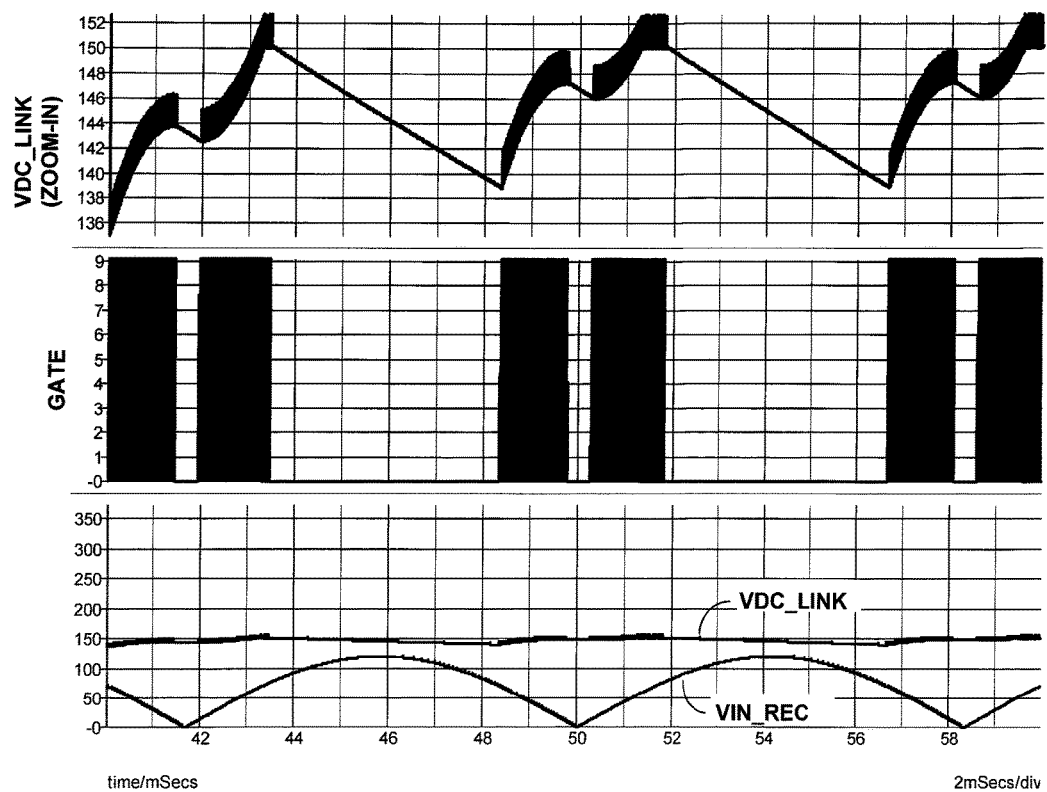
FIGS. 15 and 16 show typical operating waveforms of the AC-DC boost converter of FIG. 14 in accordance with an embodiment of the present invention.
Figure 16:
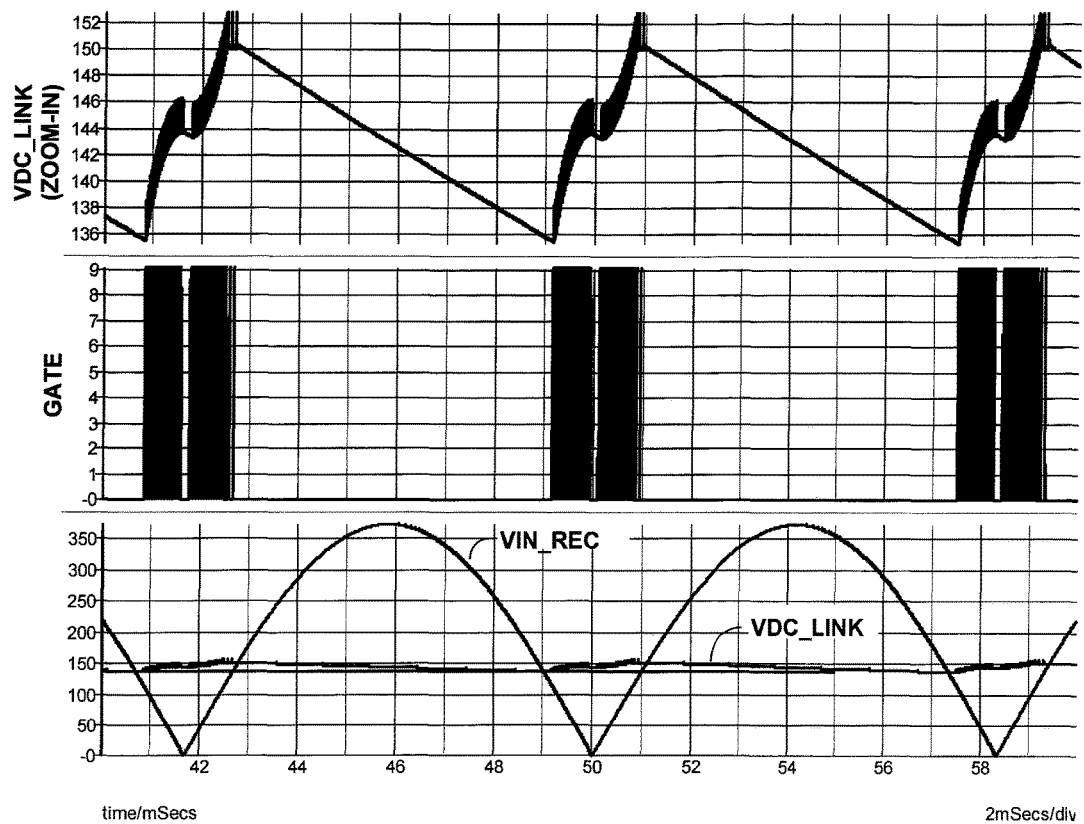

FIG. 14 shows a schematic diagram of an AC-DC boost converter 240 in accordance with an embodiment of the present invention. The AC-DC boost converter 240 is a particular embodiment of the AC-DC converter 100 of FIG. 1 that employs a boost converter 103B for DC-DC conversion. The other components of the AC-DC boost converter 240 are as described with reference to FIG. 1. In the example of FIG. 14, a DC switch Sdc is turned OFF by the narrowband control circuit 104 when not in the PWM zone, so as to prevent current flow through the freewheeling diode D1 when not in the PWM zone. In the example of FIG. 14, the DC link voltage is allowed to become less than the peak of the rectified input AC line input voltage (Vin_rec) by, for example, appropriately setting the voltage Vset of the narrow band control unit 104. FIGS. 15 and 16 show typical operating waveforms of the AC-DC boost converter 240 of FIG. 14 in accordance with an embodiment of the present invention. FIGS. 15 and 16 show the zoom-in of the DC link voltage (VDC_LINK(ZOOM-IN)), the gate signal (GATE) driving the main switch S1, the DC link voltage (VDC_LINK), and the rectified input AC line voltage (VIN_REC). Not shown in FIGS. 15 and 16 is the control signal for the DC switch Sdc, which is turned OFF when not in the PWM zone.

FIG. 15 shows typical operating waveforms when the input AC line voltage is relatively low ("low line"), and FIG. 16 shows typical operating waveforms when the input AC line voltage is relatively high ("high line"). As shown in FIG. 16, the AC-DC boost converter 240 allows the DC link voltage to be less than the peak of the rectified input AC line voltage.

Figure 17:
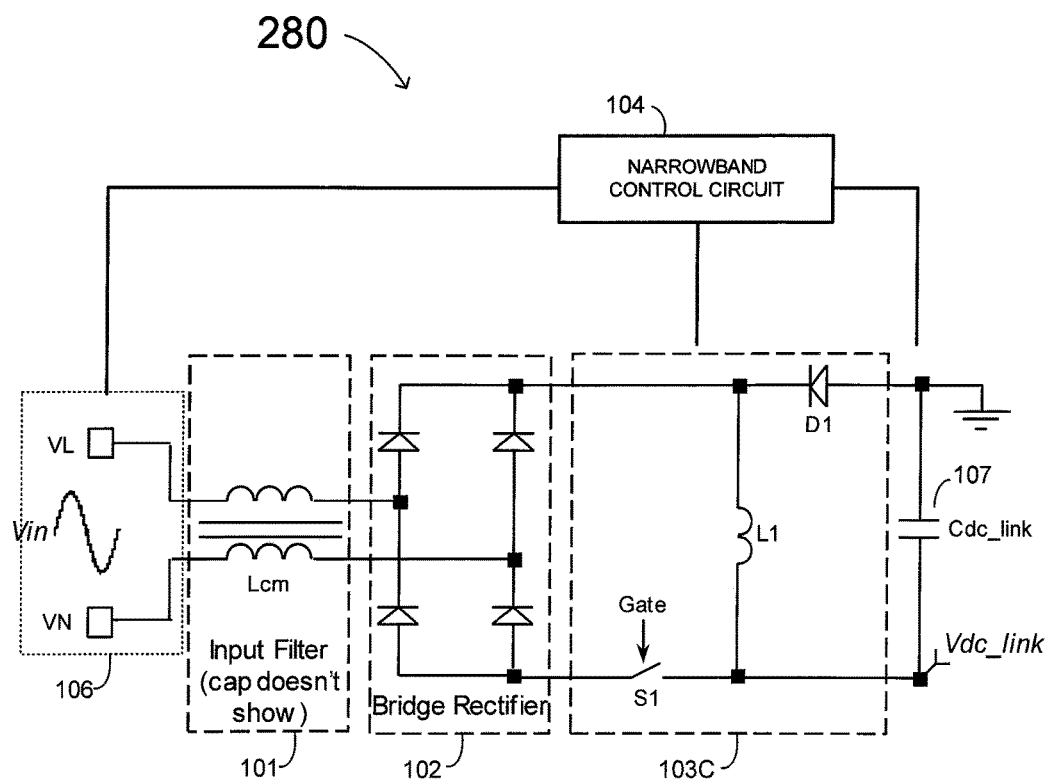
FIG. 17 shows a schematic diagram of an AC-DC buck-boost converter in accordance with an embodiment of the present invention.

FIG. 17 shows a schematic diagram of an AC-DC buck-boost converter 280 in accordance with an embodiment of the present invention. The AC-DC buck-boost converter 280 is a particular embodiment of the AC-DC converter 100 of FIG. 1 that employs a buck-boost converter 103C for DC-DC conversion. The other components of the AC-DC buck-boost converter 280 are as described with reference to FIG. 1.

Figure 18:
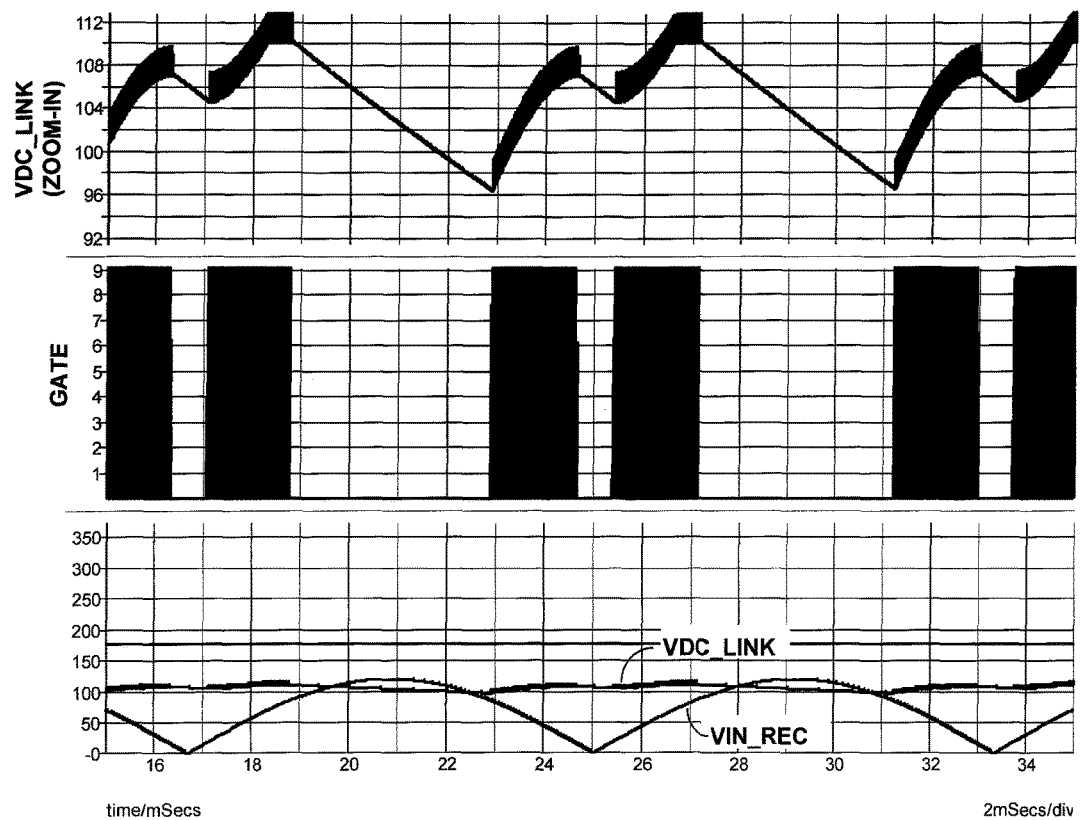
FIGS. 18 and 19 show typical operating waveforms of the AC-DC buck-boost converter of FIG. 17 in accordance with an embodiment of the present invention.
Figure 19:
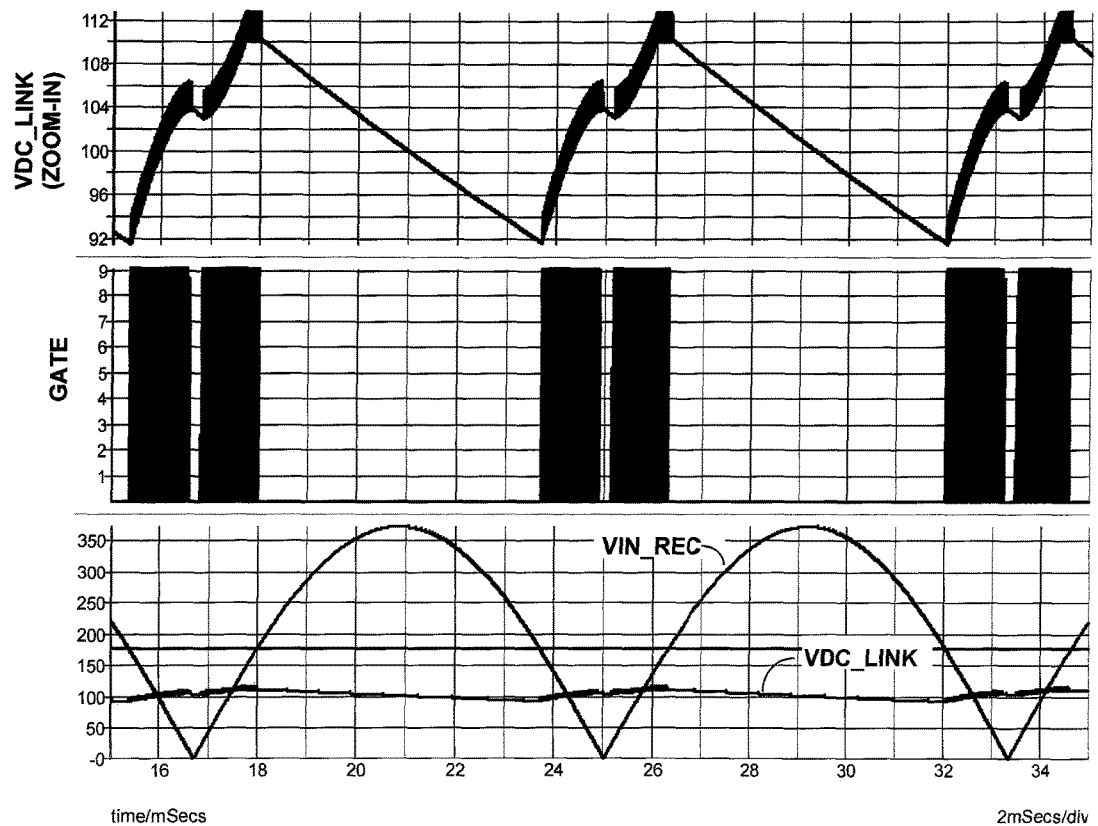

FIGS. 18 and 19 show typical operating waveforms of the AC-DC buck-boost converter 280 of FIG. 17 in accordance with an embodiment of the present invention. FIGS. 18 and 19 show the zoom-in of the DC link voltage (VDC_LINK (ZOOM-IN)), the gate signal (GATE) driving the main switch S1, the DC link voltage (VDC_LINK), and the rectified input AC line voltage (VIN_REC). FIG. 18 shows typical operating waveforms when the input AC line voltage is relatively low ("low line"), and FIG. 19 shows typical operating waveforms when the input AC line voltage is relatively high ("high line").

Figure 20:
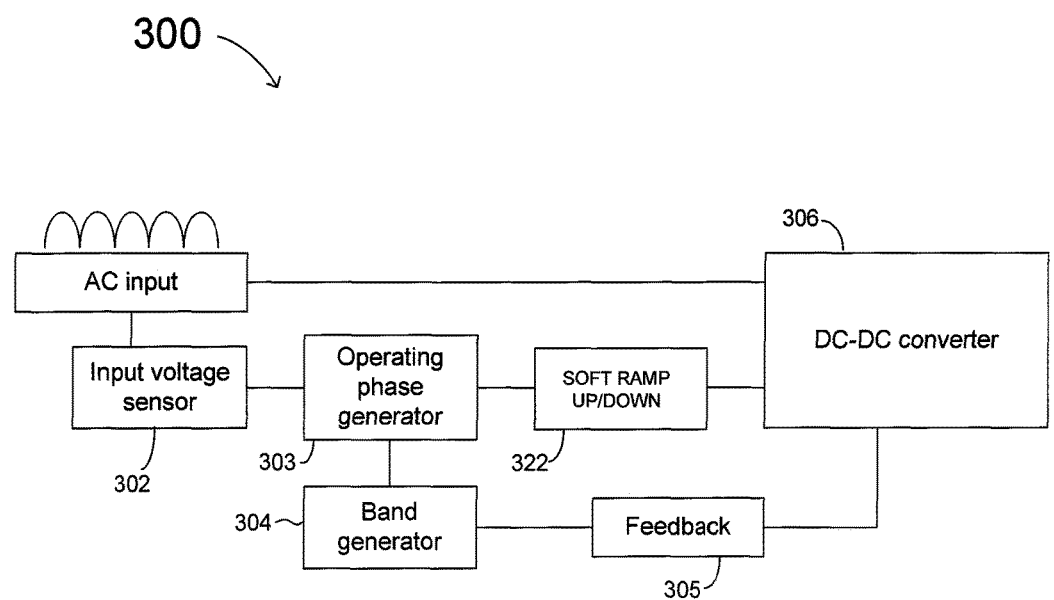
FIG. 20 shows a schematic diagram of an AC-DC buck converter with input AC line control in accordance with an embodiment of the present invention.

As can be appreciated from the foregoing, an AC-DC converter with input AC line control in accordance with embodiments of the present invention may be realized using a variety of circuit topologies. For example, FIG. 20 shows a schematic diagram of an AC-DC buck converter 300 with input AC line control in accordance with an embodiment of the present invention. As can be appreciated, converter topologies other than a buck converter topology may also be employed without detracting from the merits of the present invention.

In the example of FIG. 20, the AC-DC buck converter 300 comprises a DC-DC buck converter 306 and an input AC line control circuit formed by an input AC line voltage sensor 302, an operating phase generator 303, a band generator 304, a feedback circuit 305, and a soft ramp up/down circuit 322. As can be appreciated, the components of the AC-DC buck converter 300 may be realized in accordance with the following description and operational waveforms.

Similar to the AC-DC converter 100 of FIG. 1, the AC-DC buck converter 300 may enable or disable switching of the main switch depending on the input AC line. More particularly, to reduce switching loss, the AC-DC buck converter 300 may be configured to allow switching of the main switch only when the level of the input AC line voltage is within a regulation band. The main switch may be prevented from switching when the level of the input AC line voltage is not within the regulation band. The regulation band may be defined by a low band threshold at the minimum end of the regulation band and by a high band threshold at the maximum end of the regulation band. The main switch may be turned ON only when the input AC line voltage is higher than the low band threshold but lower than the high band threshold.

In some embodiments, the regulation band may be predetermined or dynamically varied according to load conditions. The band thresholds may be variable according to different load conditions with constant current peak. The band thresholds may be variable according to different load conditions with constant turn on time operation. The current through the main switch may be soft-started to reduce peak current and line frequency audible noise. The current through the main switch may also be decreased just before disabling switching of the main switch for better EMI control.

In the example of FIG. 20, the input AC line voltage sensor 302 comprises an electrical circuit that senses the input AC line voltage. The input AC line voltage sensor 302 may be configured to detect the input AC line voltage, such as whether the input AC line voltage is in low line or high line condition. In one embodiment, the input AC line voltage sensor 302 includes a rectifier circuit that rectifies the input AC line voltage into a rectified input AC line voltage, which is employed for input AC line voltage comparisons.

The band generator 304 may comprise an electrical circuit that is configured to adjust the regulation band, and thus the range of input AC line voltages that allow the main switch to be switched, according to the load connected to the output of the DC-DC converter 306 as detected by the feedback circuit 305 or according to other conditions.

The operating phase generator 303 may comprise an electrical circuit that is configured to compare the input AC line voltage detected by the input AC line voltage sensor 302 against bands and thresholds set by the band generator 304 to determine whether or not to allow switching of the main switch. In one embodiment, the operating phase generator 303 generates a PWM enable signal that indicates whether or not the main switch may be modulated by PWM.

Figure 21:
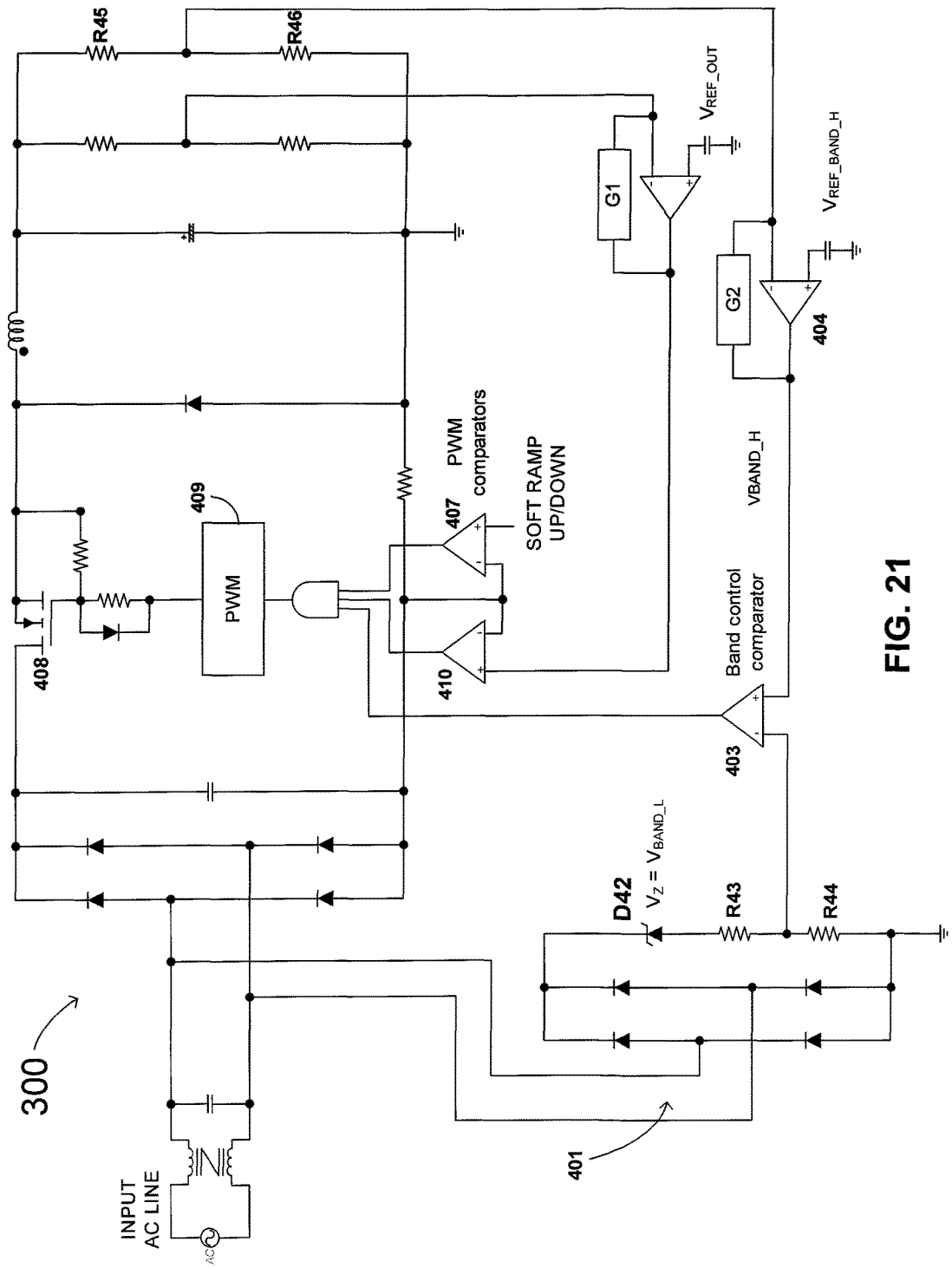
FIG. 21 shows a schematic diagram of an AC-DC buck converter with input AC line control in accordance with an embodiment of the present invention.

FIG. 21 shows a schematic diagram of the AC-DC buck converter 300 in accordance with an embodiment of the present invention. In the example of FIG. 30, the AC-DC buck converter 300 includes an input AC line voltage sensor in the form of a bridge rectifier 401 and a voltage divider network comprising a resistor R43, a resistor R44, and a Zener diode D42. The Zener diode D42 sets a low band threshold voltage VZ. A feedback circuit comprising a voltage divider network formed by the resistors R45 and R46 provides a feedback voltage indicative of the output voltage. The feedback circuit allows for monitoring of load conditions for dynamically adjusting the regulation band, for example. In the example of FIG. 21, a band control comparator 403, an operational amplifier 404, and PWM comparators 407 and 410 form a combined operating phase generator and band generator.

In the example of FIG. 21, the output voltage is divided by the resistors R45 and R46 to generate a feedback voltage. The feedback voltage is compared to a reference voltage VREF_BAND_H by the amplifier 404 with a feedback gain G2 to generate the high band threshold voltage VBAND_H. As can be appreciated, the high band threshold voltage VBAND_H dynamically varies based on the output voltage.

The band control comparator 403 compares the level of the rectified input AC line voltage to the high band threshold voltage output of the amplifier 404 to generate a PWM enable signal. The PWM enable signal is asserted when the input AC line voltage is within the regulation band. The PWM circuit 409 switches the main switch 408 by PWM when the PWM enable signal is asserted. Otherwise, when the PWM enable signal is not asserted, the PWM circuit 409 is disabled and does not switch the main switch 408.

In the example of FIG. 21, the PWM comparator 410 outputs a PWM OFF signal for turning OFF the main switch 408. A soft ramp up/down signal generated by a soft ramp up/down circuit is input to the PWM comparator 407 to provide a reference for the peak of the drain current of the main switch when the input AC line voltage is within the regulation band. This allows the peak drain current to have some slope at the beginning of the current profile.

Figure 22:
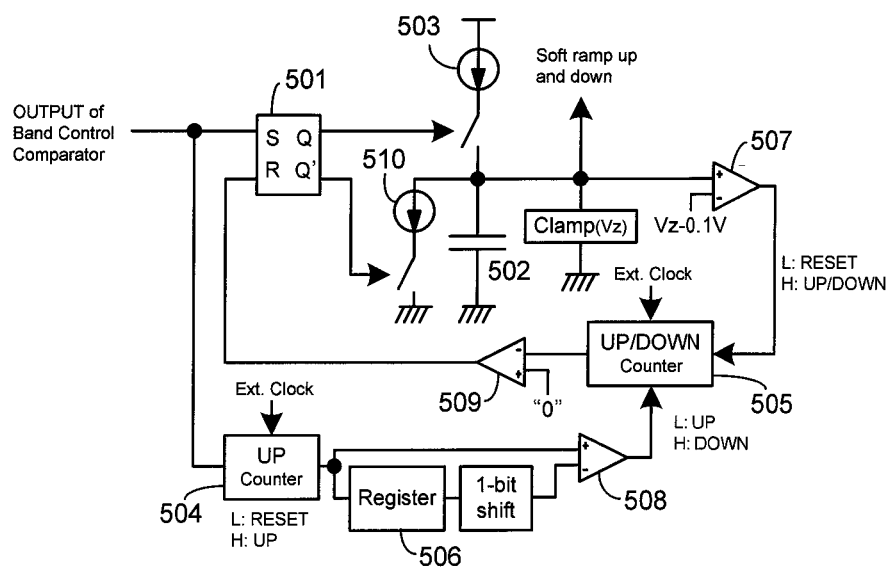
FIG. 22 shows a schematic diagram of a soft ramp up/down circuit in accordance with an embodiment of the present invention.

FIG. 22 shows a schematic diagram of a soft ramp up/down circuit 322 in accordance with an embodiment of the present invention. The soft ramp up/down circuit 322 of FIG. 22 is explained together with the AC-DC buck converter 300 of FIG. 21. When the output of the band control comparator 403 is HIGH, the input S of the SR flip-flop 501 is also HIGH. This results in the charging of the internal capacitor 502 by the upper side current source 503. The voltage increase on the capacitor 502 is relatively fast, so that the voltage on the capacitor 502 reaches its clamp voltage (Vz) in a short period of time, allowing for soft ramp up of the current through the main switch 408 (see soft ramp up of current waveforms in FIGS. 23 and 24).

The other circuit blocks of the soft ramp up/down circuit 322 allow for soft ramp down. In the example of FIG. 22, the counters 504 and 505 receive an external clock. During the previous HIGH duration of the output of the band control comparator 403, the UP counter 504 counted the on-duration of the output of the band control comparator 403 using the external clock. When the output of the band control comparator 403 goes LOW, the count in the UP counter 504 is stored in the register 506 and then shifted right by 1-bit, which means half of the on-duration is stored in the register 506. On the other hand, after the voltage on the internal capacitor 502 voltage exceeds Vz-0.1V, the output of the comparator 507 goes HIGH, which causes the UP/DOWN counter 505 to start operating. When the output of the band control comparator 403 goes HIGH, the UP counter 504 starts counting and the comparator 508 will output LOW until the on-duration of the output of band control comparator 403 reaches its half value; then the UP/DOWN counter 505 will increase from "0", i.e., zero count. When the on-duration of the output of band control comparator 403 reaches its half value, the comparator 508 will output a HIGH, then the count of the UP/DOWN counter 505 starts decreasing. When the count of the UP/DOWN counter 505 reaches "0," the comparator 509 outputs a HIGH, resulting in the internal capacitor 502 being discharged by the lower side current sink 510. The discharge rate of the internal capacitor 502 is also very fast, providing for the soft ramp down shape of the current through the main switch.

Figure 23:
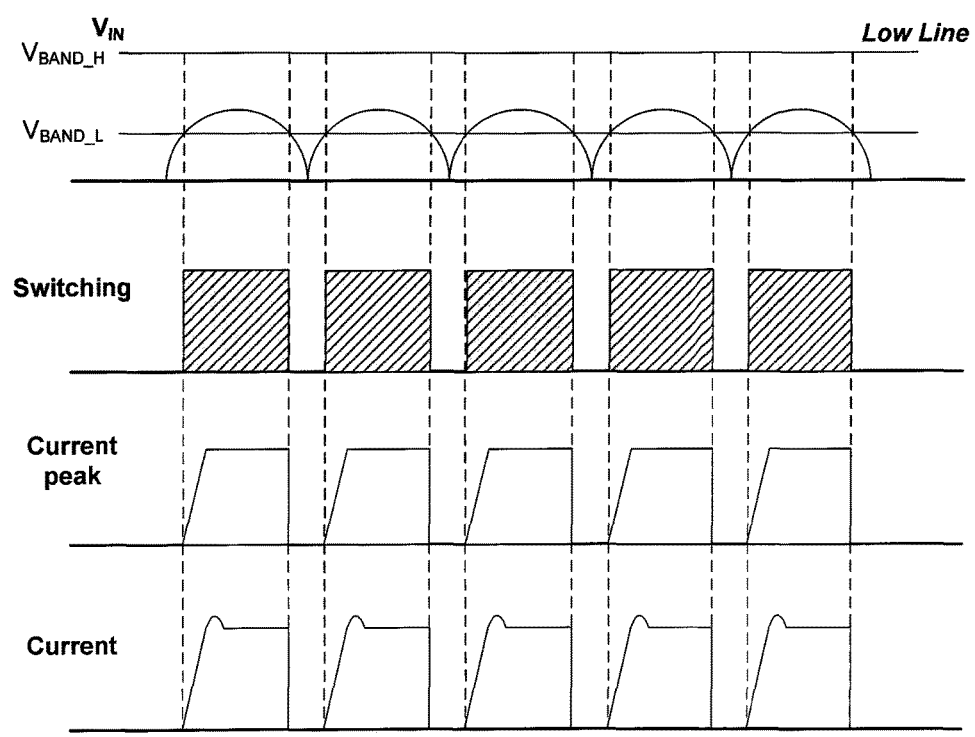
FIGS. 23 and 24 show waveforms of an AC-DC buck converter with soft ramp up/down current control in accordance with an embodiment of the present invention.
Figure 24:
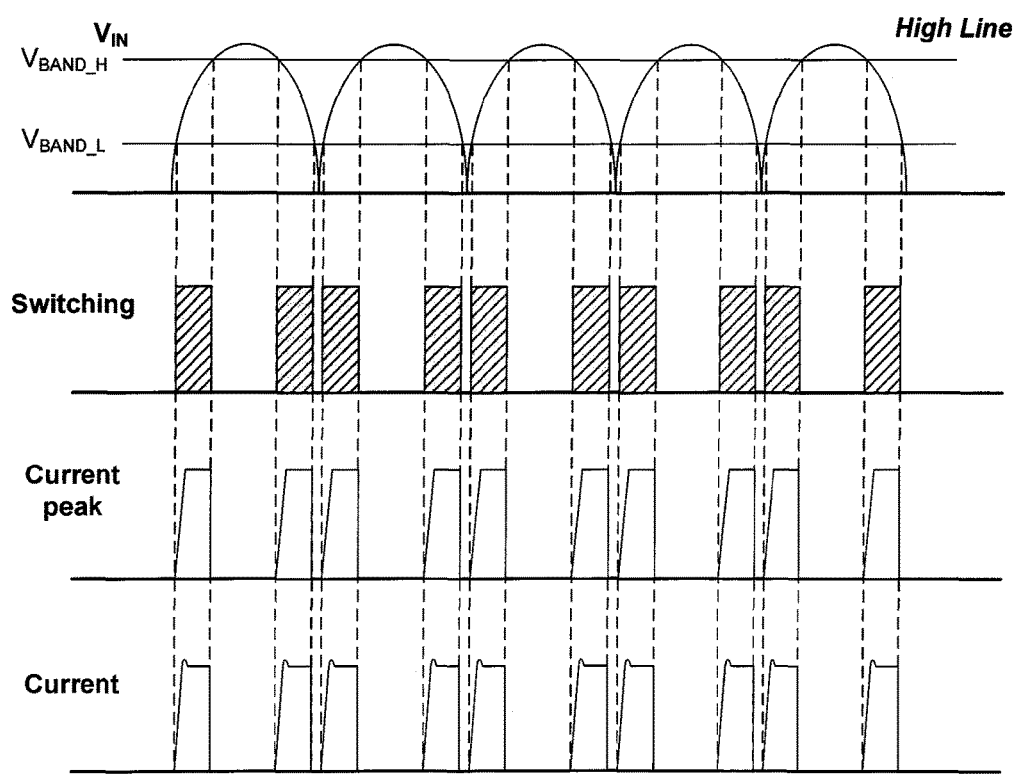

FIGS. 23 and 24 show waveforms of the AC-DC buck converter 300 with soft ramp up/down current control in accordance with an embodiment of the present invention. FIGS. 23 and 24 show the waveforms of the rectified input AC line voltage (Vin), the switching of the main switch (Switching), the peak drain current reference of the main switch (Current peak), and the real peak drain current of the main switch (Current). FIG. 23 shows the waveforms when the input AC line voltage is relatively low ("low line"), while FIG. 24 shows the waveforms when the input AC line voltage is relatively high ("high line"). In the example of FIGS. 23 and 24, the regulation band is defined by a low band threshold (VBAND_L) voltage and a high band threshold (VBAND_H) voltage. The switching of the main switch occurs only when the rectified input AC line voltage is within the regulation band, i.e., higher than the low band threshold voltage and lower than the high band threshold voltage. The main switch is prevented from switching, and thus cannot be modulated by PWM, when the rectified input AC line voltage is outside the regulation band. The current through the main switch is soft-started to reduce surge peak current and line frequency audible noise.

Figure 25:
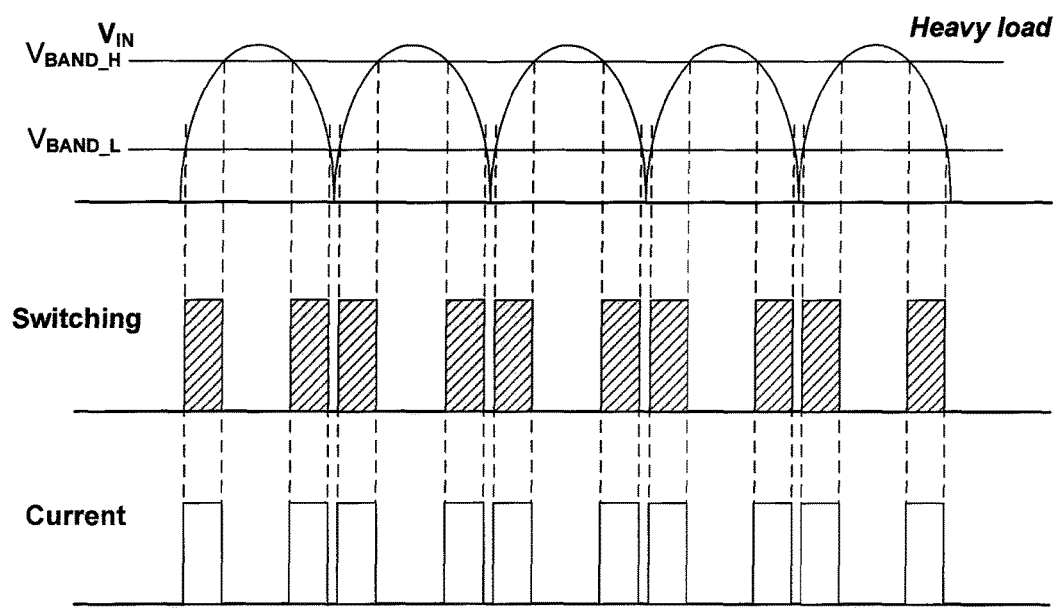
FIGS. 25 and 26 show waveforms of an AC-DC buck converter where the regulation band is dynamically adjusted according to load conditions with constant current peak operation, in accordance with an embodiment of the present invention.
Figure 26:
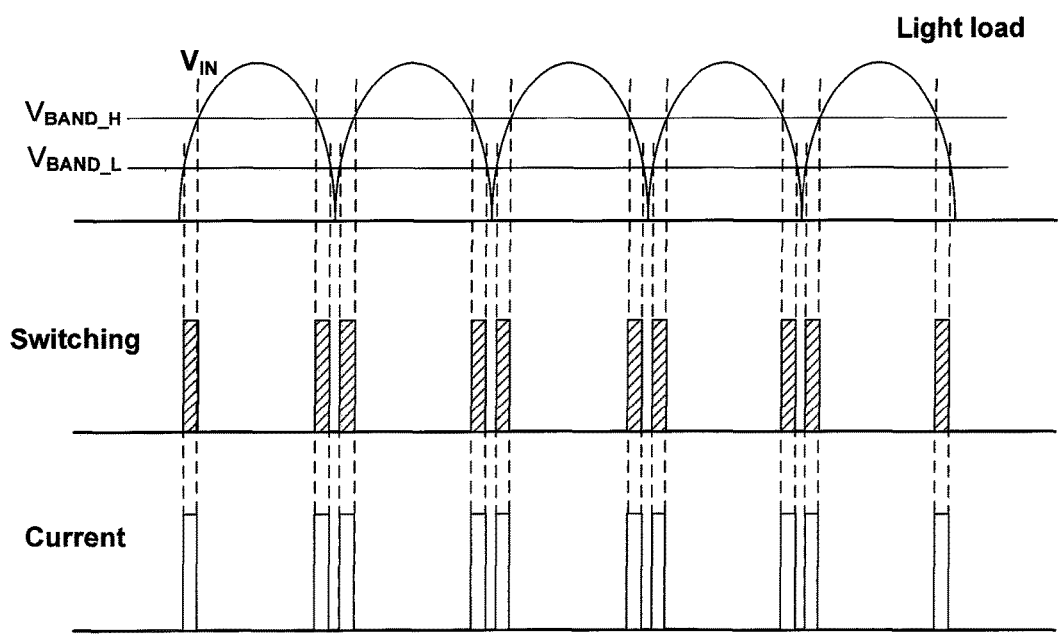

FIGS. 25 and 26 show waveforms of the AC-DC buck converter 300 where the regulation band is dynamically adjusted according to load conditions with constant current peak operation, in accordance with an embodiment of the present invention. FIGS. 25 and 26 show the waveforms of the rectified input AC line voltage (Vin), the switching of the main switch (Switching), the current of the main switch (Current), and the regulation band defined by the low band threshold (VBAND_L) voltage and the high band threshold (VBAND_H) voltage. FIG. 25 shows the waveforms during heavy load condition, and FIG. 26 shows the waveforms during light load conditions. As shown in FIG. 25, the regulation band is widened to provide more output current during heavy load conditions. During light load conditions, as shown in FIG. 26, the regulation band is narrowed for improved efficiency.

Figure 27:
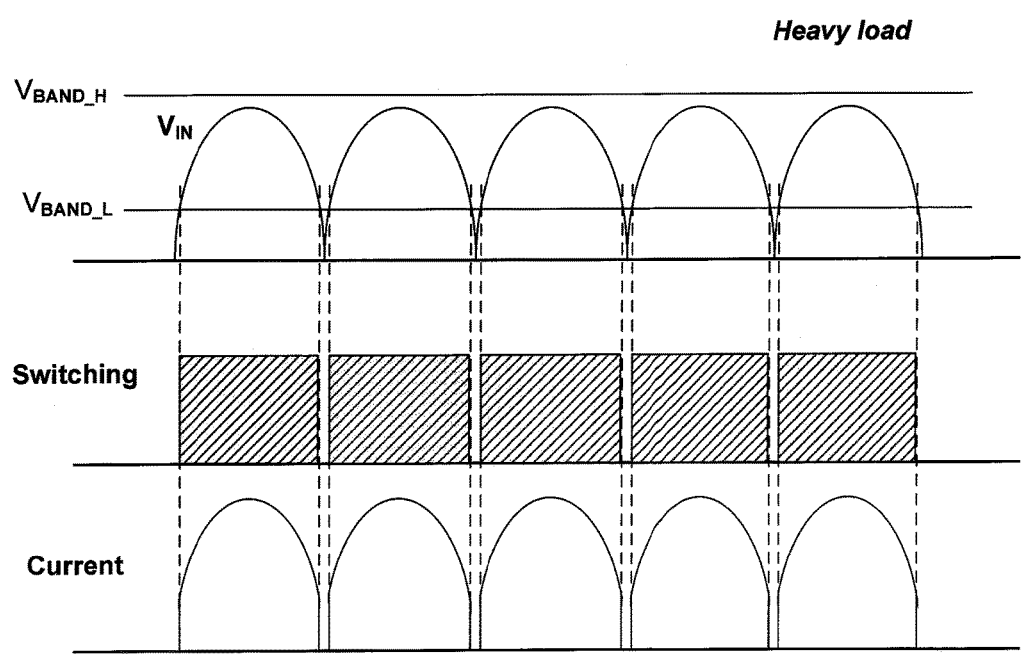
FIGS. 27 and 28 show waveforms of an AC-DC buck converter where the regulation band is dynamically adjusted according to load conditions with constant turn-on time operation, in accordance with an embodiment of the present invention.
Figure 28:
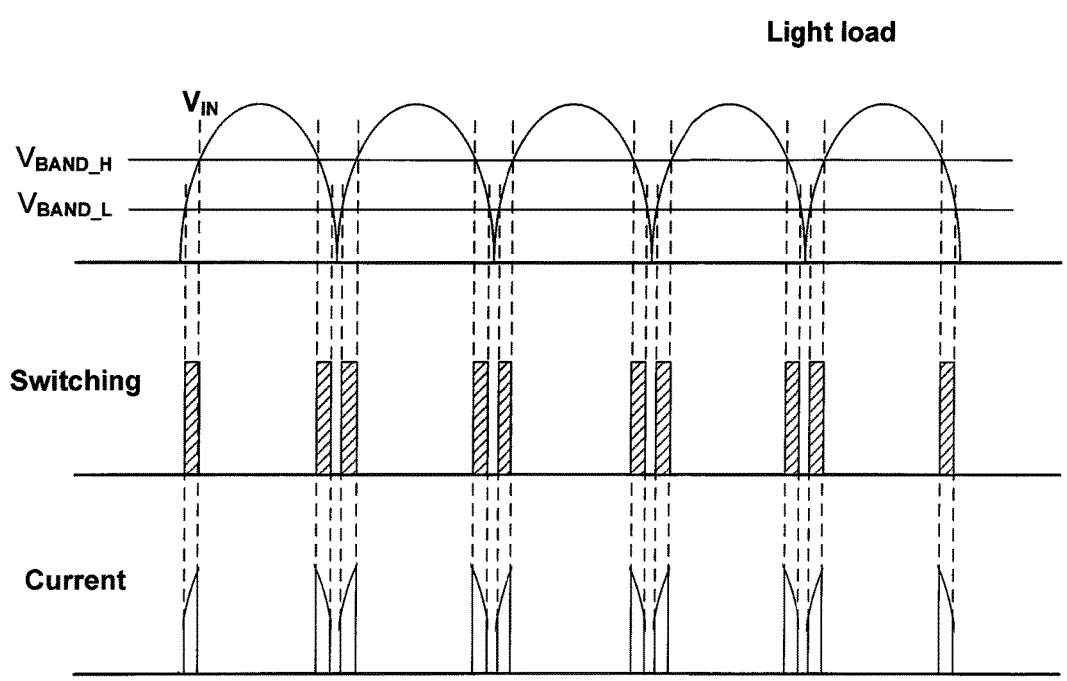

FIGS. 27 and 28 show waveforms of the AC-DC buck converter 300 where the regulation band is dynamically adjusted according to load conditions with constant turn-on time operation, in accordance with an embodiment of the present invention. The input AC line control scheme illustrated by FIGS. 27 and 28 is suitable for power factor correction applications, for example.

FIGS. 27 and 28 show the waveforms of the rectified input AC line voltage (Vin), the switching of the main switch (Switching), the current of the main switch (Current), and the regulation band defined by the low band threshold (VBAND_L) voltage and the high band threshold (VBAND_H) voltage. FIG. 27 shows the waveforms during heavy load condition, and FIG. 28 shows the waveforms during light load conditions. As shown in FIG. 27, the regulation band is widened with the high band threshold being raised higher than the rectified input AC voltage during heavy load conditions. The regulation band is narrowed during light load conditions, as shown in FIG. 28.

AC-DC converters with input AC line control have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. An AC-DC converter comprising:
   a first rectifier circuit that is configured to rectify an input AC line voltage to generate a rectified input AC line voltage;
   a DC-DC converter that is configured to receive the rectified input AC line voltage and to control a switching operation of a main switch to convert the rectified input AC line voltage to an output DC voltage; and
   an input AC line control circuit that is configured to:
      detect, over a half cycle of the input AC line voltage, a voltage indicative of the rectified input AC line voltage;
      prohibit switching of the main switch within the half cycle when the voltage indicative of the rectified input AC line voltage is below a low threshold voltage;
      enable switching of the main switch within the half cycle when the voltage indicative of the rectified input AC line voltage is between the low threshold voltage and a high threshold voltage; and
      prohibit switching of the main switch within the half cycle when the voltage indicative of the rectified input AC line voltage is above the high threshold voltage;
      wherein the low threshold voltage is positive and has a first magnitude, the high threshold voltage is positive and has a second magnitude, and the second magnitude is higher than the first magnitude.

2. The AC-DC converter of claim 1, wherein the input AC line control circuit comprises:
   an input voltage sensor that is configured to detect the voltage indicative of the rectified input AC line voltage; and
   a comparator circuit that compares the voltage indicative of the rectified input AC line voltage to the low threshold voltage and the high threshold voltage.

3. The AC-DC converter of claim 2, wherein the input voltage sensor comprises a second rectifier circuit.

4. The AC-DC converter of claim 1, wherein the input AC line control circuit comprises:
   an input voltage sensor that rectifies the input AC line voltage to generate the voltage indicative of the rectified input AC line voltage;
   a band generator that generates the low threshold voltage and the high threshold voltage; and
   an operating phase generator that is configured to compare the voltage indicative of the rectified input AC line voltage to the low threshold voltage and the high threshold voltage to determine whether or not to prohibit switching of the main switch.

5. The AC-DC converter of claim 4, wherein the band generator is configured to adjust at least the high threshold voltage depending on load conditions.

6. The AC-DC converter of claim 4, wherein the band generator is configured to adjust at least the high threshold voltage depending on a level of the input AC line voltage.

7. The AC-DC converter of claim 1, further comprising a soft ramp up/down circuit for soft-starting a current through the main switch.

8. A method of operating an AC-DC converter, the method comprising:
   rectifying an input AC line voltage to generate a rectified AC line voltage; and
   controlling a switching operation of a main switch to generate an output DC voltage;
   during a half cycle of the input AC line voltage, the controlling comprises:
      preventing the main switch from switching when a level of the rectified AC line voltage is below a regulation band;
      switching the main switch when the level of the rectified AC line voltage is within the regulation band;
      preventing the main switch from switching when the level of the rectified AC line voltage is above the regulation band; and
      wherein the regulation band has a low threshold voltage that is positive and has a first magnitude, a high threshold voltage is positive and has a second magnitude, and the second magnitude is higher than the first magnitude.

9. The method of claim 8, further comprising:
   varying the regulation band according to load conditions.

10. The method of claim 8, wherein the switching operation of the main switch is controlled by PWM when the level of the rectified AC line voltage is within the regulation band.

11. The method of claim 10, wherein switching the main switch further comprises switching of the main switch when the level of the rectified AC line voltage is higher than a low band threshold of the regulation band and lower than a high band threshold of the regulation band.

12. The method of claim 8, further comprising:
   adjusting the regulation band to control a peak current or turn-on time of the main switch.

13. The method of claim 8, further comprising:
   soft-starting a current through the main switch so that the current through the main switch ramps up when the main switch is turned ON.

14. The method of claim 8, further comprising:
   ramping down a current through the main switch before the main switch is prevented from switching.

15. An AC-DC converter comprising:
   an input AC line voltage sensor circuit that detects an input AC line voltage;
   a DC-DC converter comprising a main switch and a pulse width modulation (PWM) controller that controls a switching operation of the main switch to generate a regulated DC output voltage; and
   a control circuit that, within a single half cycle of the input AC line voltage, prevents switching of the main switch when the input AC line voltage is not within a PWM zone defined by a range of input AC line voltage levels that are positive, non-zero, and less than a peak positive voltage of the input AC line voltage, and the control circuit enables switching of the main switch when the input AC input voltage is within the PWM zone.

16. The AC-DC converter of claim 15, wherein the control circuit comprises:
   a comparator circuit that compares a level of the input AC line voltage to a low threshold and a high threshold; and
   a disable circuit that prevents the PWM controller from turning ON the main switch when the level of the input AC line voltage is not between the low threshold and the high threshold.

17. The AC-DC converter of claim 16, wherein a rectifier rectifies the input AC line voltage to generate a first rectified input AC line voltage, the comparator circuit compares the first rectified input AC line voltage to the low threshold and the high threshold, and the disable circuit prevents the PWM controller from turning ON when the first rectified input AC line voltage is not between the low threshold and the high threshold.

18. The AC-DC converter of claim 15, wherein the DC-DC converter is a buck converter.

19. The AC-DC converter of claim 15, wherein the DC-DC converter is a boost converter.

20. The AC-DC converter of claim 15, further comprising a bridge rectifier that rectifies the input AC line voltage to generate a second rectified input AC line voltage and the DC-DC converter converts the second rectified input AC line voltage to the DC output voltage by the switching operation of the main switch.

* * * * *